Oct. 1, 1946.                F. A. RODMAN                 2,408,483
                        LAMINATED GLASS STRUCTURE
                         Filed March 28, 1942

Inventor
FRANK A. RODMAN.

By
Frank Fraser
Attorney

Patented Oct. 1, 1946

2,408,483

UNITED STATES PATENT OFFICE 2,408,483

LAMINATED GLASS STRUCTURE

Frank A. Rodman, Toledo, Ohio, assignor to Libbey-Owens-Ford Glass Company, Toledo, Ohio, a corporation of Ohio Application March 28, 1942, Serial No. 436,605

7 Claims. (Cl. 189—76)

This invention relates to laminated glass structures which, while not restricted to any particular use, have been primarily designed for and are of especial utility in glazing the windshield and/or window openings in airplanes and other aircraft.

It has been heretofore proposed to make such a laminated glass structure comprising two sheets of glass and an interposed layer of thermoplastic adherent thereto to form a unit construction, and in which the plastic interlayer extends beyond the edges of the glass sheets and serves as a resilient supporting means for the glass itself.

When mounting a glazing unit of this type, it has been customary to clamp the extended portion only of the plastic interlayer in or upon the supporting frame to provide a flexible mounting for the laminated structure. Due to such mounting, there is permitted a certain resiliency or freedom of movement of the structure relative to the supporting frame whereby torsion and shock to which the airplane may be subjected will be "cushioned" and for all practical purposes will not be transmitted directly to the glass when the plane is in flight and twists, weaves, or is subjected to varying pressure differentials, thereby eliminating or reducing to a minimum the tendency of cracking or shattering of the glass from such causes. In other words, the laminated structure is permitted to move within the windshield or window opening without introduction of localized strains.

An aim of this invention is the provision of an improved form of laminated glass structure of the above type characterized by the provision of means for strengthening and reinforcing the extended plastic without adversely affecting the resiliency or freedom of movement of the structure relative to the supporting frame in or upon which it is mounted.

Another object of the invention is the provision of means associated with the extended portion of the plastic interlayer for reducing the liability of weakening, tearing, or shearing of the plastic even when the laminated structure is subjected to relatively great strains or stresses or to relatively high pressures such as are present in the supercharged cabins of airplanes.

A further object of the invention is the provision of means carried by the extended portion of the plastic interlayer and cooperating therewith to form a metal frame around the edges of the laminated structure serving either as a means to secure the structure in a fixed position or slidable within a channel in the mounting means, if a slidable closure is desired.

Other objects and advantages of the invention will become more apparent during the course of the following description when taken in connection with the accompanying drawing.

In the drawing wherein like numerals are employed to designate like parts throughout the same:

Figure 1:
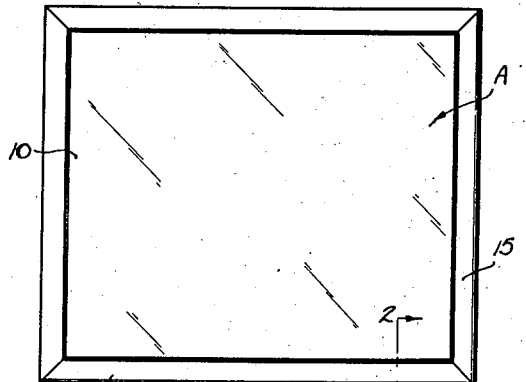
Fig. 1 is a plan view of a laminated glass structure formed in accordance with the invention.
Figures 2, 4:
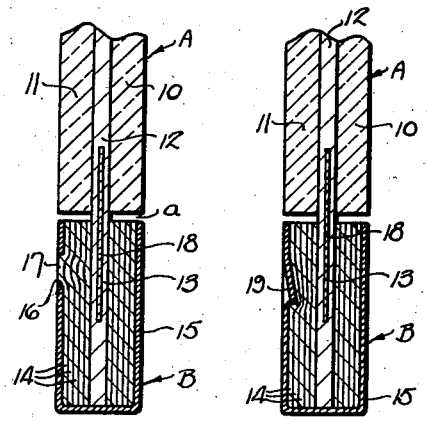
Fig. 2 is a transverse section through one edge portion thereof taken in line 2—2 of Fig. 1.
Fig. 4 is a transverse section showing a modified construction.
Figures 3, 5:
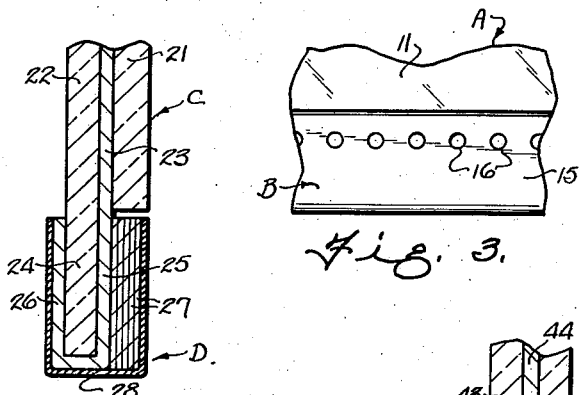
Fig. 3 is a plan view of one edge portion of the structure looking at the side thereof opposite to Fig. 1.
Fig. 5 is a plan view of a portion of Fig. 4.

With reference now to the drawing, and particularly to Figs. 1, 2 and 3, there is disclosed a laminated structure A comprising a sheet of laminated safety glass including the two sheets of glass 10 and 11 and interposed layer of thermoplastic 12 adherent thereto. The glass sheets 10 and 11 may consist of ordinary plate or window glass and may be either fully tempered or semi-tempered, or any desired combination of glass sheets may be used. Likewise, a sheet of relatively hard, transparent plastic material, such as Plexiglass or the like, may be substituted for either or both of the glass sheets 10 and 11, if desired.

The plastic interlayer 12 is preferably of a synthetic resin material such as, for example, a polyvinyl acetal resin. By way of example only, the plastic interlayer may be formed of polyvinyl butyracetal resin plasticized with approximately 15 to 30 parts dibutyl sebacate per 100 parts of resin by weight. However, different plastics varying in thickness and physical characteristics may be employed, and the invention is not limited to the use of any particular resin, class of resins, cellulosic derivative, or the like.

As shown, the glass sheets 10 and 11 are coextensive while the area of the plastic interlayer 12 is relatively greater than that of the glass sheets so that it projects therebeyond, as indicated at 13, to form in effect a frame B extending entirely around the laminated structure and serving as a means for mounting the same. The frame B is of approximately the same thickness as the laminated structure A, and this is accomplished by bonding to opposite sides of the extended plastic 13 one or a plurality of strips of thermoplastic 14 to give the desired thickness. Fitting over the extended plastic 13 and plastic strips 14 is a metal channel member 15 forming a sheath for strengthening and reinforcing the extended plastic.

In fabricating the unit, the plastic strips 14 can first be bonded to one another and to the extended plastic 13, after which the metal sheath 15 can be slipped thereover and secured thereto or, if preferred, the metal sheath can be associated with the plastic strips 14 before they are bonded to the extended plastic 13, and the unit then subjected to heat and pressure whereupon the plastic strips will be adhered to one another and to the extended plastic 13 while the metal sheath will also be bonded to the plastic strips. To provide for a more definite locking of the metal sheath to the plastic, the said sheath may be provided with a plurality of holes 16 into which portions of the plastic will flow, as indicated at 17, when the unit is subjected to heat and pressure.

From the above, it will be seen that the extended plastic 13, plastic strips 14 and metal sheath 15 all cooperate to form the frame B extending entirely around the laminated structure and by which the structure may either be clamped in a fixed position in a supporting frame or slidably mounted in a suitable channel if a slidable closure is desired. It will be noted that the frame B is spaced slightly from the peripheral edges of the glass sheets 10 and 11 to leave a relatively narrow gap a therebetween so that the provision of the metal sheath 15 will not adversely affect the yieldability or resiliency of the mounting. In other words, the frame B only is adapted to be clamped or supported so that the laminated structure A will be permitted a certain amount of movement to and fro in the opening due to the resiliency of the plastic. Because of this, the glass sheets will be cushioned against mechanical vibration, shocks, torsional stresses, etc., of the plane when in flight, thereby reducing or eliminating the tendency of cracking or shattering of the glass from such causes.

If desired, the strips of plastic 14 can be formed of a relatively softer plastic material than the plastic interlayer 12 so that they will serve as a cushion for the extended plastic 13 upon subjection of the unit to relatively great strains and stresses or differentials in pressure. Also, a metal insert 18 in the form of a strip of relatively thin, flexible metal may be embedded in the plastic interlayer 12 to bridge the gap a, whereby to reduce any tendency toward shearing or stretching of the plastic between the metal frame B and laminated structure A.

Figure 6:
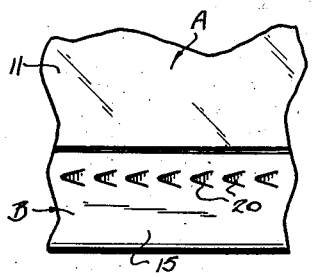
Fig. 6 is a plan view showing a modified arrangement.

The glazing unit illustrated in Figs. 4 and 5 is of the same construction shown in Figs. 1, 2 and 3, with the single exception that the metal sheath 15, instead of being provided with a plurality of holes 16, is formed with a plurality of pointed prongs 19 which are struck from the metal sheath and bite into the strips of plastic 14 to effectively prevent the said sheath from becoming detached from the plastic. The prongs 19 may project outwardly as shown in Fig. 4 or, if desired, they may extend longitudinally as shown at 20 in Fig. 6.

Figure 7:
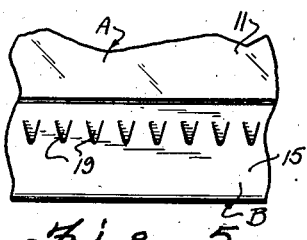
Figs. 7, 8 and 9 are transverse sections showing still other forms of the invention.

In Fig. 7 is illustrated another form of the invention comprising a laminated structure C including the two sheets of glass 21 and 22 and interposed layer of thermoplastic 23 adherent thereto. It will be noted that the area of the glass sheet 21 is relatively less than that of glass sheet 22 so that the marginal portion 24 of sheet 22 projects beyond the sheet 21. The plastic interlayer 23 also projects beyond the sheet 21 and covers the inner surface of the projecting portion 24 of sheet 22 as shown at 25, said plastic interlayer being also of sufficient size that it can be wrapped around the extended portion 24 of sheet 22 as indicated at 26. Bonded to the extended portion 25 of the plastic interlayer is a plurality of strips of plastic 27 and fitting over the extended glass and plastic is a sheath 28 in the form of a metal channel member which can be secured to the plastic as shown in either Figs. 3, 5 or 6. The strips 27 can be of a relatively softer plastic than the plastic interlayer 23, if desired.

Figure 8:
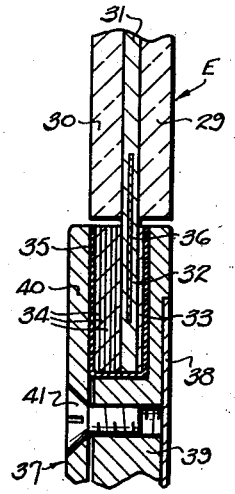

In Fig. 8 is shown another form of the invention comprising a laminated structure E including the two sheets of glass 29 and 30 and interposed adherent layer of thermoplastic 31. In this instance, the plastic interlayer 31 also extends beyond the edges of the glass sheets as at 32 and has secured to the outer face thereof a single strip of plastic 33 and to its inner face a plurality of plastic strips 34. Fitting over and suitably secured to the extended plastic is a metal sheath 35, while embedded in the plastic interlayer is a metal insert 36. This construction provides for a so-called "flush" type of mounting which is particularly desirable in airplanes and other aircraft.

By way of example, the extended plastic and metal sheath carried thereby are mounted in a frame 37 secured to the outer wall or skin 38 of the plane. The frame 37 comprises a stationary section 39 and removable section 40 between which the extended plastic is clamped by screws or the like 41. As will be noted, the outer surface of the outer glass sheet 29 is flush with the skin 38 of the plane and the outer surface portion of the frame 37. Of course, other types of mountings may be provided for the laminated structure. Thus, the laminated structure may be slidably mounted with the metal sheath 35 slidable in a suitable channel.

Figure 9:
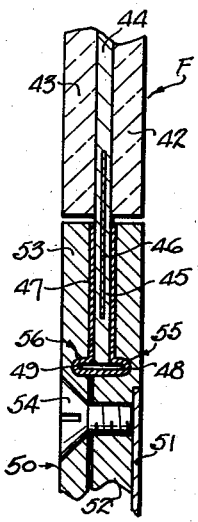

In Fig. 9 is disclosed a still further form of the invention comprising a laminated structure F including the glass sheets 42 and 43 and interposed layer of thermoplastic 44. The plastic interlayer 44 projects beyond the edges of the glass sheets as indicated at 45 and also has embedded therein the metal insert 46. Fitting over the extended plastic 45 is a metal sheath 47 also in the form of a channel member and provided at the outer edge or base thereof with the laterally and oppositely projecting enlargements or ribs 48 and 49 to form a substantially T-construction. The laminated structure F is mounted within a supporting frame 50 carried by the outer wall or skin 51 of the plane, said frame comprising the two sections 52 and 53 between which the extended plastic 45 and metal sheath 47 are clamped by screws or the like 54. The inner adjacent faces of the frame sections 52 and 53 are provided with grooves 55 and 56 respectively within which the ribs 48 and 49 are received, with the result that the laminated structure F is firmly locked in place and effectively prevented from being pulled out of the frame even when subjected to excessive strains or stresses or differentials in pressure.

It is to be understood that the forms of the invention herewith shown and described are to be taken as illustrative embodiments only of the same and that various changes in the shape, size and arrangement of parts may be resorted to without departing from the spirit of the invention or the scope of the subjoined claims.

I claim:

1. A laminated glass structure, comprising two sheets of glass and an interposed layer of thermoplastic adherent thereto, said plastic interlayer extending beyond the edges of the glass sheets, and a metal sheath in the form of a channel member fitting over the extended portion of the plastic interlayer and secured thereto, said metal sheath having a laterally enlarged locking portion at its outer edge.

2. A laminated glass structure, comprising two sheets of glass and an interposed layer of thermoplastic adherent thereto, said plastic interlayer extending beyond the edges of the glass sheets, and a metal sheath in the form of a channel member fitting over the extended portion of the plastic interlayer and secured thereto, said metal sheath being provided with a plurality of prongs struck therefrom and biting into the plastic.

3. An integral laminated glass glazing unit for mounting in a frame, comprising two sheets of glass and an interposed layer of thermoplastic adherent thereto and extending outwardly beyond the edges of the glass sheets, and a metal sheath in the form of a channel member fitting over the extended portion of the plastic interlayer and secured thereto, said metal sheath being spaced from the peripheral edges of the glass sheets and forming with the extended portion of the plastic interlayer a metal covered flexible attaching flange for clamping in said frame.

4. An integral laminated glass glazing unit for mounting in a frame, comprising two sheets of glass and an interposed layer of thermoplastic adherent thereto and extending outwardly beyond the edges of the glass sheets, a strip of plastic material bonded to one face of the extended portion of the plastic interlayer to render said extended portion of the interlayer of increased thickness relative to that part thereof that is between the glass sheets, and a metal sheath covering both side of the extended portion of the plastic interlayer with the plastic strip carried thereby and secured thereto, said metal sheath being spaced from the peripheral edges of the glass sheets and forming with the extended portion of the plastic interlayer a metal faced flexible attaching flange for clamping in said frame.

5. An integral laminated glass glazing unit for mounting in a frame, comprising two sheets of glass and an interposed layer of thermoplastic adherent thereto and extending outwardly beyond the edges of the glass sheets, a strip of plastic material that is of a softer plastic material than the interlayer bonded to one face of the extended portion of the plastic interlayer to render said extended portion of the interlayer of increased thickness relative to that part thereof that is between the glass sheets, and a metal sheath in the form of a channel member fitting over the extended portion of the plastic interlayer and the plastic strip carried thereby and secured thereto, said metal sheath being spaced from the peripheral edges of the glass sheets and forming with the extended portion of the plastic interlayer a metal covered flexible attaching flange for clamping in said frame.

6. An integral laminated glass glazing unit for mounting in a frame, comprising two sheets of glass and an interposed layer of thermoplastic adherent thereto and extending outwardly beyond the edges of the glass sheets, and a metal sheath in the form of a channel member fitting over the extended portion of the plastic interlayer and secured thereto, said metal sheath being spaced from the peripheral edges of the glass sheets and having a plurality of openings for receiving a portion of the plastic therein to form with the extended portion of the plastic interlayer a metal covered flexible attaching flange for clamping in said frame.

7. An integral laminated glass glazing unit for mounting in a frame, comprising two sheets of glass and an interposed layer of thermoplastic adherent thereto and extending outwardly beyond the edges of the glass sheets, and a metal sheath including sheets of metal covering both sides of the extended portion of the plastic interlayer, said metal sheath being located outwardly beyond and spaced from the peripheral edges of the glass sheets and forming with the extended portion of the plastic interlayer a metal faced flexible attaching flange for fitting into said frame.

FRANK A. RODMAN.